United States Patent
Raphael

(10) Patent No.: US 8,489,353 B2
(45) Date of Patent: Jul. 16, 2013

(54) METHODS AND SYSTEMS FOR CALIBRATING VEHICLE VISION SYSTEMS

(75) Inventor: Eric L. Raphael, Birmingham, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 601 days.

(21) Appl. No.: 12/353,042

(22) Filed: Jan. 13, 2009

(65) Prior Publication Data
US 2010/0179781 A1 Jul. 15, 2010

(51) Int. Cl.
*G01C 17/38* (2006.01)

(52) U.S. Cl.
USPC .................................. 702/95; 702/86; 702/94

(58) Field of Classification Search
USPC ................................................ 702/95, 86, 94
See application file for complete search history.

(56) References Cited

U.S. PATENT DOCUMENTS

2005/0002544 A1 * 1/2005 Winter et al. ................. 382/104
2005/0270784 A1 * 12/2005 Hahn et al. .................... 362/459

FOREIGN PATENT DOCUMENTS

JP 2007261463 A * 10/2007

* cited by examiner

*Primary Examiner* — Elias Desta
(74) *Attorney, Agent, or Firm* — Ingrassia Fisher & Lorenz, P.C.

(57) ABSTRACT

A method for calibrating a vision system of a vehicle includes the steps of projecting a pattern in proximity to the vehicle and calibrating the vision system using an image of the pattern generated by the vision system.

14 Claims, 2 Drawing Sheets

METHODS AND SYSTEMS FOR CALIBRATING VEHICLE VISION SYSTEMS

TECHNICAL FIELD

The present invention generally relates to the field of vehicles and, more specifically, to methods and systems for calibrating vision systems of vehicles.

BACKGROUND OF THE INVENTION

Certain vehicles today utilize cameras in various vehicle vision systems including, for example rear view cameras, collision alert systems, lane departure warning systems, adaptive cruise control systems, high beam assist systems, pedestrian recognition systems, and traffic sign recognition systems. These vehicle vision systems may be calibrated from time to time to help ensure that the associated cameras are aligned properly and provide optimal images. Typically, such calibration is performed by using visible reference points, such as buildings, bridges, or the horizon. However, it can be difficult to properly recognize the various different visible reference points that may surround the vehicle at any particular point in time, thus making calibration of the vehicle vision systems more difficult.

Accordingly, it is desirable to provide an improved method for calibrating a vision system of a vehicle, for example that does not rely on such visible reference points. It is also desirable to provide an improved program product for such vision system calibration. It is further desirable to provide an improved system for such vision system calibration. Furthermore, other desirable features and characteristics of the present invention will be apparent from the subsequent detailed description and the appended claims, taken in conjunction with the accompanying drawings and the foregoing technical field and background.

SUMMARY OF THE INVENTION

In accordance with an exemplary embodiment of the present invention, a method for calibrating a vision system of a vehicle is provided. The method comprises the steps of projecting a pattern in proximity to the vehicle and calibrating the vision system using an image of the pattern generated by the vision system.

In accordance with another exemplary embodiment of the present invention, a program product for calibrating a vision system of a vehicle is provided. The program product comprises a program and a computer-readable signal-bearing media. The program is configured to at least facilitate projecting a pattern in proximity to the vehicle and calibrating the vision system using an image of the pattern generated by the vision system. The computer-readable signal-bearing media bears the program.

In accordance with a further exemplary embodiment of the present invention, a system for calibrating a vision system of a vehicle is provided. The system comprises a projection unit and a processor. The projection unit is configured to at least facilitate projecting a pattern in proximity to the vehicle. The processor is configured to at least facilitate calibrating the vision system using an image of the pattern generated by the vision system.

BRIEF DESCRIPTION OF THE DRAWINGS

The present invention will hereinafter be described in conjunction with the following drawing figures, wherein like numerals denote like elements, and wherein.

DETAILED DESCRIPTION OF THE INVENTION

The following detailed description is merely exemplary in nature, and is not intended to limit the invention or the application and uses of the invention. Furthermore, there is no intention to be bound by any expressed or implied theory presented in the preceding technical field, background, brief summary or the following detailed description.

Figure 1:
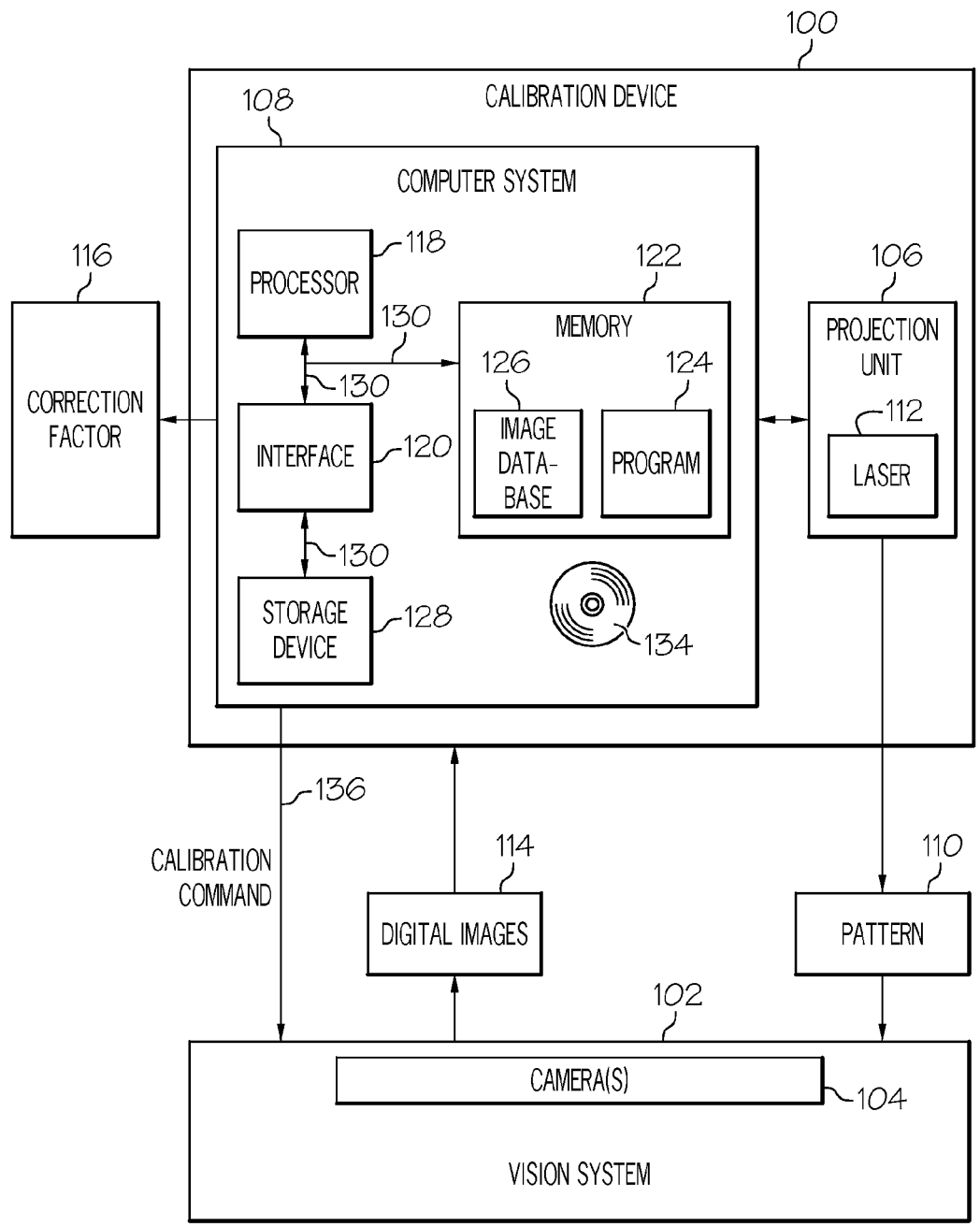
FIG. 1 is a functional block diagram of a calibration device for calibrating a vision system of a vehicle, in accordance with an exemplary embodiment of the present invention.

FIG. 1 is a functional block diagram of a calibration device 100 for calibrating a vision system 102 of a vehicle, in accordance with an exemplary embodiment of the present invention. As depicted in FIG. 1, the vision system 102 being calibrated has one or more cameras 104. In various embodiments, the cameras 104 may include any one or more of a number of devices that generate and/or record still images and/or moving images. The vision system 102 may include, by way of example only, one or more of the following: a rear view camera, a collision alert system, a lane departure warning system, an adaptive cruise control system, a high beam assist system, a pedestrian recognition system, and a traffic sign recognition system.

In the depicted embodiment, the calibration device 100 comprises a projection unit 106 and a computer system 108. The projection unit 106 projects a pattern 110 in proximity to the vehicle. In a preferred embodiment, the projection unit 106 projects the pattern 110 in a region that can be easily recognized and read by the vision system 102. Also in a preferred embodiment, the projection unit 106 comprises a laser 112 that projects the pattern 110 in the infrared light spectrum.

The pattern 110 is read by the vision system 102. Preferably, the pattern 110 is viewed or read by one or more cameras 104 of the vision system 102 in creating one or more digital images 114 of the pattern 110. The digital images 114 are used by the computer system 108 in generating a correction factor 116 for calibrating the vision system 102, and preferably for calibrating the one or more cameras 104 of the vision system 102.

The computer system 108 includes a processor 118, a memory 122, a computer bus 130, an interface 120, and a storage device 128. In addition, while the projection unit 106 is depicted outside the computer system 108, it will be appreciated that the projection unit 106 may be a part of the computer system 108 in various embodiments.

The processor 118 performs the computation and control functions of the computer system 108 or portions thereof, and may comprise any type of processor or multiple processors, single integrated circuits such as a microprocessor, or any suitable number of integrated circuit devices and/or circuit boards working in cooperation to accomplish the functions of a processing unit. During operation, the processor 118 executes one or more programs 124 preferably stored within the memory 122 and, as such, controls the general operation of the computer system 108. In certain embodiments, the digital images 114 are in the form of electronic signals. However, this may vary in other embodiments.

In a preferred embodiment, the processor 118 processes the digital images 114 from the vision system 102 which, as noted above, are preferably generated by one or more cameras 104 of the vision system 102. The processor 118 processes the digital images 114 by comparing the digital images 114 to one another or to one or more known images from an image database 126 stored in the memory 122 in order to calculate the above-mentioned correction factor 116 for the vision system 102. Also in a preferred embodiment, the processor 118 issues a calibration command 136 when calibration of the vision system 102 is desired. In addition, in certain embodiments, the processor 118 generates the pattern 110 or retrieves the pattern 110 from memory for use by the projection unit 106. In performing these functions, the processor 118 preferably executes one or more programs 124 stored in the memory 122 in conducting the steps of the process 200 depicted in FIG. 2 and described further below in connection therewith.

As referenced above, the memory 122 stores a program or programs 124 that execute one or more embodiments of processes such as the process 200 described below in connection with FIG. 2 and/or various steps thereof and/or other processes, such as those described elsewhere herein. In addition, in the depicted embodiment, the memory 122 also stores the above-referenced image database 126. In a preferred embodiment, the image database 126 includes one or more known images of the pattern 110, for use in comparing with the digital images 114 obtained from the vision system 102.

The memory 122 can be any type of suitable memory. This would include the various types of dynamic random access memory (DRAM) such as SDRAM, the various types of static RAM (SRAM), and the various types of non-volatile memory (PROM, EPROM, and flash). It should be understood that the memory 122 may be a single type of memory component, or it may be composed of many different types of memory components. In addition, the memory 122 and the processor 118 may be distributed across several different computers that collectively comprise the computer system 108. For example, a portion of the memory 122 may reside on a computer within a particular apparatus or process, and another portion may reside on a remote computer.

The computer bus 130 serves to transmit programs, data, status and other information or signals between the various components of the computer system 108. The computer bus 130 can be any suitable physical or logical means of connecting computer systems and components. This includes, but is not limited to, direct hard-wired connections, fiber optics, infrared and wireless bus technologies.

The interface 120 allows communication to the computer system 108, for example from a vehicle occupant, a system operator, and/or another computer system, and can be implemented using any suitable method and apparatus. In certain embodiments, the interface 120 facilitates communications between the computer system 108 and the projection unit 106 and the vision system 102. For example, in certain embodiments, the interface 120 facilitates the receipt of the digital images 114 by the processor 118 from the vision system 102 and the transmission of the calibration command 136 from the processor 118 to the vision system 102. The interface 120 can include one or more network interfaces to communicate within or to other systems or components, one or more terminal interfaces to communicate with technicians, and one or more storage interfaces to connect to storage apparatuses such as the storage device 128.

The storage device 128 can be any suitable type of storage apparatus, including direct access storage devices such as hard disk drives, flash systems, floppy disk drives and optical disk drives. In one exemplary embodiment, the storage device 128 is a program product from which memory 122 can receive a program 124 that executes one or more embodiments of the process 200 of FIG. 2 and/or steps thereof as described in greater detail further below. In one preferred embodiment, such a program product can be implemented as part of, inserted into, or otherwise coupled to the calibration device 100. As shown in FIG. 1, the storage device 128 can comprise a disk drive device that uses disks 134 to store data. As one exemplary implementation, the computer system 108 may also utilize an Internet website, for example for providing or maintaining data or performing operations thereon.

It will be appreciated that while this exemplary embodiment is described in the context of a fully functioning computer system, those skilled in the art will recognize that the mechanisms of the present invention are capable of being distributed as a program product in a variety of forms, and that the present invention applies equally regardless of the particular type of computer-readable signal bearing media used to carry out the distribution. Examples of signal bearing media include: recordable media such as floppy disks, hard drives, memory cards and optical disks (e.g., disk 134), and transmission media such as digital and analog communication links. It will similarly be appreciated that the computer system 108 may also otherwise differ from the embodiment depicted in FIG. 1, for example in that the computer system 108 may be coupled to or may otherwise utilize one or more remote computer systems and/or other control systems.

Figure 2:
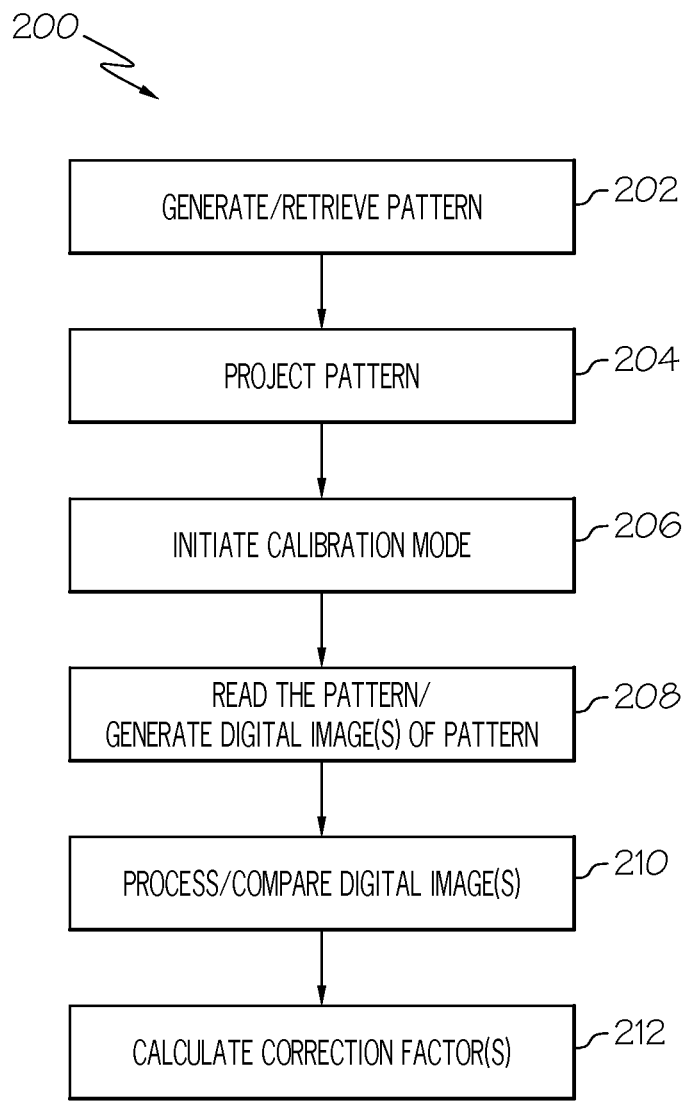
FIG. 2 is a flowchart of a process for calibrating a vision system of a vehicle, and that can be implemented in connection with the calibration device of FIG. 1, in accordance with an exemplary embodiment of the present invention.

FIG. 2 is a flowchart of a process 200 for calibrating vision systems of vehicle, in accordance with an exemplary embodiment of the present invention. In a preferred embodiment, the process 200 can be implemented in connection with the calibration device 100 of FIG. 1 and/or through program products that can be utilized in connection therewith. However, it will be appreciated that in various embodiments the process 200 may also be utilized in connection with any number of different types of systems and/or other devices.

As depicted in FIG. 2, the process 200 includes the step of generating or retrieving a pattern (step 202). In a preferred embodiment, the pattern corresponds to the pattern 110 of FIG. 1. Also in a preferred embodiment, the pattern represents a grid pattern with straight lines and right angles. However, this may vary in other embodiments, as other types of patterns may be used. In addition, in one exemplary embodiment, the pattern is generated by the processor 118 of FIG. 1 and provided to the projection unit 106 of FIG. 1. In another exemplary embodiment, the pattern is retrieved by the processor 118 of FIG. 1 from the memory 122 of FIG. 1 and provided to the projection unit 106 of FIG. 1.

The process 200 continues with a projecting of the pattern (step 204). In a preferred embodiment, the pattern is projected by the projection unit 106 of FIG. 1, most preferably by a laser 112 thereof. The pattern is preferably projected in proximity to the vehicle and, specifically, in proximity to the vision system 102 of FIG. 1, so that the vision system 102 can easily read and recognize the pattern. In one preferred embodiment, the pattern is projected onto a road in proximity to the vehicle. Also in a preferred embodiment, the pattern is projected in an infrared spectrum, so that the pattern will not be visible to the driver of the vehicle or to the driver of other nearby vehicles.

In one preferred embodiment, a calibration mode is initiated for the vision system (step 206). While in the calibration mode, as discussed in more detail below, the vision system reads the pattern, creates digital images of the pattern, and supplies the digital images to the processor for processing. In a preferred embodiment, a command from the processor 118 of FIG. 1 initiates the calibration mode via instructions provided to the vision system 102 to operate in the calibration mode.

Once in the calibration mode, the vision system reads the pattern, to thereby generate one or more digital images of the pattern (step 208). In one preferred embodiment, the one or more cameras 104 of the vision system 102 of FIG. 1 read the pattern and generate the digital images as they read the pattern. The digital images are preferably supplied to the processor 118 of FIG. 1 for processing, as set forth below.

The process 200 continues with the processing of the digital images (step 210). In one preferred embodiment, the processor 118 of FIG. 1 processes the digital images by comparing the digital images to one another. For example, in such a preferred embodiment in which the vision system 102 of FIG. 1 includes two or more cameras 104, the processor 118 of FIG. 1 preferably compares digital images from each camera 104 to check for any misalignment in the cameras 104 and/or to correct any optical distortion in the vision system 102. In another preferred embodiment, for example in which the vision system 102 includes a single camera 104, the processor 118 of FIG. 1 compares the digital image created by the camera 104 to one or more known images of the pattern from the image database 126 stored in the memory 122 of FIG. 1 in order to find any misalignment in the camera 104 and/or to correct any optical distortion in the vision system 102.

In addition, one or more correction factors are calculated (step 212). In one preferred embodiment mentioned above in which the vision system 102 of FIG. 1 includes two or more cameras 104, the correction factor preferably includes a correction factor to account for any misalignment in the cameras 104 and/or to correct any optical distortion in the vision system 102 as determined by the comparison of the digital images from the respective cameras 104. This correction factor is then preferably stored in the memory 122 of FIG. 1 and used in aligning and interpreting subsequent images generated by the cameras 104 of FIG. 1 while the vision system 102 of FIG. 1 is operating in a standard operational (non-calibration) mode.

In another preferred embodiment mentioned above in which the vision system 102 of FIG. 1 includes one camera 104, the correction factor preferably includes a correction factor to account for any misalignment in the camera 104 and/or to correct any optical distortion in the vision system 102 as determined by the comparison of the digital image from the camera 104 with the one or more images from the image database 126 of FIG. 1. This correction factor is then preferably stored in the memory 122 of FIG. 1 and used in aligning and interpreting subsequent images generated by the camera 104 of FIG. 1 while the vision system 102 of FIG. 1 is in an operation (non-calibration) mode.

It will be appreciated that certain steps of the process 200 may vary from those depicted in FIG. 2 and described herein. It will be similarly appreciated that certain steps of the process 200 may be performed simultaneously and/or in an order different from that depicted in FIG. 2 and described herein. For example, in certain embodiments, the vision system may be commanded to its calibration mode in step 206 before the pattern is generated or retrieved in step 202 and/or before the pattern is projected in step 204, among various other possible variations to the steps of the process 200 and/or the sequence thereto.

Accordingly, improved methods, program products, and systems are provided for calibrating visions systems of vehicles. The improved methods, program products, and systems provide for calibration of vehicle vision systems without relying on any specific visible reference points that may surround the vehicle at any particular point in time. This allows for greater accuracy and precision in calibrating vehicle vision systems.

It will be appreciated that, in various embodiments, the disclosed methods, program products, and systems may vary from those depicted in the figures and described herein. It will similarly be appreciated that, while the disclosed methods, program products, and systems are described above as being used in connection with automobiles such as sedans, trucks, vans, and sports utility vehicles, the disclosed methods, program products, and systems may also used in connection with any number of different types of vehicles, and in connection with any number of different systems thereof and environments pertaining thereto.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. A method for calibrating a vision system of a vehicle, the method comprising the steps of:
   projecting, from a laser, a pattern in an infrared spectrum on a road in proximity to the vehicle; and
   calibrating the vision system using an image of the pattern generated by the vision system.

2. The method of claim 1, further comprising the step of:
   initiating a calibration mode;
   wherein the steps of projecting and calibrating the vision system are conditioned upon the initiation of the calibration mode.

3. The method of claim 1, wherein the step of projecting comprises the step of:
   projecting, from the laser, a grid pattern in an infrared spectrum on a road in proximity to the vehicle.

4. The method of claim 1, wherein the step of calibrating the vision system comprises the step of:
   comparing the image to a known reference image.

5. The method of claim 1, wherein the vision system comprises a first camera and a second camera, and the step of calibrating the vision system comprises the steps of:
   processing a first image of the pattern, the first image generated by the first camera;
   processing a second image of the pattern, the second image generated by the second camera; and
   comparing the first and second images.

6. A non-transitory processor-readable storage medium having processor-readable code embodied thereon for programming at least one processor to perform a method for calibrating a vision system of a vehicle, the method comprising:
   projecting a pattern from a laser in an infrared spectrum on a road in proximity to the vehicle; and
   calibrating the vision system using an image of the pattern generated by the vision system.

7. The method according to claim 6, wherein the program is further configured to at least facilitate:
   initiating a calibration mode; and
   projecting the pattern and calibrating the vision system conditioned upon the initiation of the calibration mode.

8. The method according to claim 6, wherein the pattern comprises a grid pattern.

9. The method according to claim 6, wherein the program is further configured to at least facilitate calibrating the vision system by comparing the image to a known reference image.

10. The method according to claim 6, wherein:
wherein the vision system comprises a first camera and a second camera, and further comprising:
processing a first image of the pattern, the first image generated by the first camera;
processing a second image of the pattern, the second image generated by the second camera; and
comparing the first and second images.

11. A system for calibrating a vision system of a vehicle, the system comprising:
a laser configured to project a pattern in an infrared spectrum on a road in proximity to the vehicle; and
a processor configured to at least facilitate calibrating the vision system using an image of the pattern generated by the vision system.

12. The system of claim 11, wherein the pattern comprises a grid pattern.

13. The system of claim 11, wherein the processor is further configured to at least facilitate calibrating the vision system by comparing the image to a known reference image.

14. The system of claim 11, wherein:
the vision system comprises a first camera and a second camera; and
the processor is further configured to at least facilitate calibrating the vision system by:
processing a first image of the pattern, the first image generated by the first camera;
processing a second image of the pattern, the second image generated by the second camera; and
comparing the first and second images.

* * * * *